June 21, 1955     L. W. RODGERS     2,711,333
PACKING ADAPTORS FOR RECIPROCABLE RODS
Filed Aug. 2, 1951
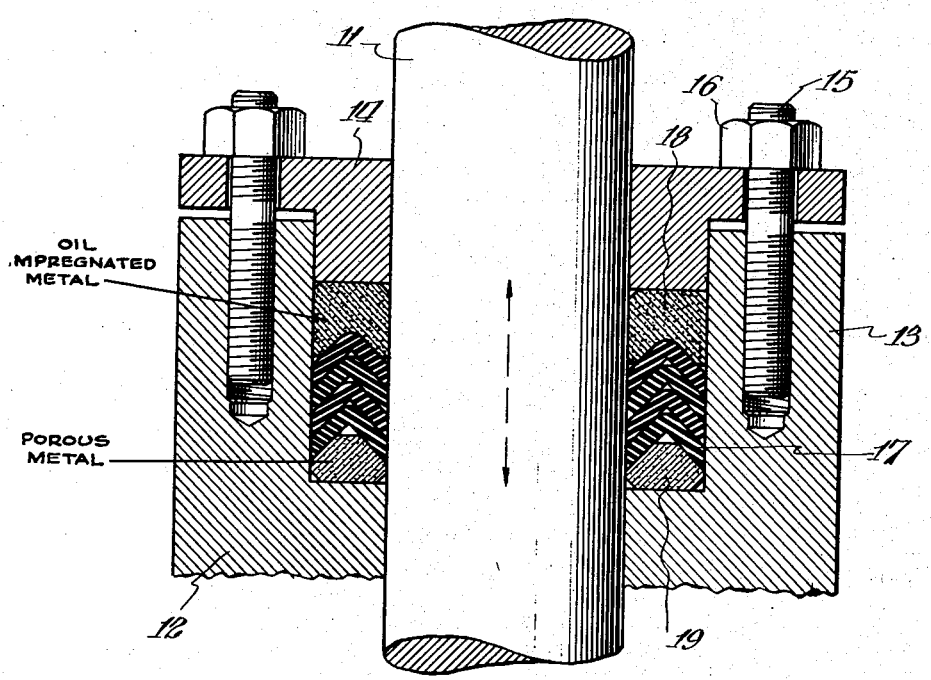
Inventor:
Lester W. Rodgers
By: Alois W. Graf
attorney

United States Patent Office 2,711,333
Patented June 21, 1955

2,711,333

PACKING ADAPTORS FOR RECIPROCABLE RODS

Lester W. Rodgers, Kenilworth, Ill., assignor to Simpson, Rodgers, Smith and Hunting, Chicago, Ill., a firm Application August 2, 1951, Serial No. 239,959

2 Claims. (Cl. 288—5)

The present invention relates to packing adaptors, and more particularly to an improved type of packing adaptor to be used in connection with V-type packings.

Heretofore it has been found that V-shaped packing rings for reciprocable rods or shafts frequently are distorted or damaged, when installed due to compression of a fluid medium between the packing rings and the packing adaptors. If compression of the fluid medium could be avoided, particularly with reference to the male packing adaptor, distortion or damage to the packing rings would be eliminated.

In accordance with the present invention it is proposed to eliminate damage or distortion of V-shaped packing rings by providing a male packing adaptor of porous material so that the fluid medium can be dispersed therethrough and dissipated without distortion of the packing.

It therefore is an object of the present invention to provide an improved permanent packing adaptor for V-shaped packing rings which does not have to be replaced whenever repacking occurs.

A further object of the invention is to provide a new and improved packing adaptor which assures immediate proper seating of packings.

Still another object of the invention is to provide an improved packing adaptor for a reciprocable shaft or rod, which is formed of porous material.

A still further object of the invention is to provide for a reciprocable shaft or rod improved packing adaptors of porous material, one of which may be impregnated with a lubricant.

Other and further objects of the present invention subsequently will become apparent from the following description taken in conjunction with the accompanying drawing, wherein:

The single figure shows a cross-section of a packing for a reciprocable rod or shaft which has been constructed in accordance with the teaching of the present invention.

Referring to the drawing there is shown a reciprocable rod 11 passing through a frame 12 of a machine which is provided with a boss 13. The boss 13 together with the cover or apertured plate 14 provides a recess forming a packing housing. The cover plate 14 is retained in position by a plurality of stud bolts 15 secured into the boss 13 and provided with suitable nuts 16.

It is intended that the present invention be applicable to the use of the conventional V-shaped packings. Two of the more commonly used V-shaped rings have angles of 90° or 100° although other angles from 60° to 130° have been used. The drawing therefore illustrates one of these packing rings such as the 90° V-ring. Usually a plurality of such rings 17 are used and in the present case the packing employs four such rings.

As is customary, such rings are generally supported by packing adaptors 18 and 19. In the conventional construction the adaptors 18 and 19 are formed of non-porous metal, rubber, plastic and the like. Where the packing adaptors 18 and 19 are formed of solid material it has been found in the past that when the cover plate 14 is tightened pressure is applied to the packing adaptor thereby tending to cause the rings 17 to be seated upon each other. However, during the installation these rings are placed in position rather loosely so that a certain amount of air or fluid medium is included between the rings and between the two packing adaptors 18 and 19. When pressure is applied by the plate 14 to the female packing adaptor 18 the air or fluid medium beneath this adaptor becomes compressed. Compression of the fluid medium has been found to produce distortion of the edges of the packing rings 17. In some cases such distortion has been so serious as to practically make the packing useless. Furthermore, such a distortion frequently is accompanied by wear when the rod 11 is reciprocated so as to permanently damage the packing rings 17.

In the use of V-shaped packing it is of extreme importance to have the rings seated properly so that the edge portions of these rings will make close and continuous contact with the surface of the reciprocable rod 11.

In accordance with the present invention it is contemplated that the normally compressed fluid medium heretofore found in other constructions will be dispersed through the male packing adaptor 19 which is formed of porous material. It has been found desirable and convenient to form both the male and female packing adaptors of porous material such as sintered bronze or steel. Since only one of the packing adaptors need be porous enough to disperse the fluid medium, the other packing adaptor such as the female packing adaptor 18 may be of sintered porous metal which has been impregnated with a suitable oil lubricant. Thus in accordance with the present invention both packing adaptors are initially formed of porous material and one of these adaptors may be impregnated with oil in order to provide a desirable lubricating arrangement. By arranging for the dispersion of fluid medium through one of the packing adaptors, preferably the male packing adaptor 19, the packing rings 17 are seated accurately to provide a proper seal without distortion or damage to the rings.

While for the purpose of illustrating and describing the present invention a preferred embodiment of the invention has been shown in the drawing, it is to be understood that the invention is not to be limited thereby since such variations and other embodiments are contemplated and may be commensurate with the spirit and scope of the invention set forth in the accompanying claims.

I claim:

1. The combination of a packing for a reciprocable rod having a plurality of resilient packing rings of V-shaped cross-section comprising male and female packing adaptors for said rings, said male packing adaptor being formed of sintered porous metal to permit a fluid medium to pass therethrough at all points by dispersion thereby to seat the adjacent packing ring without distortion when pressure is applied to said adaptor, said female packing adaptor being formed of a sintered porous metal impregnated with a lubricating oil.

2. The combination of a packing for a reciprocable rod having a plurality of resilient packing rings of V-shaped cross-section comprising male and female packing adaptors for said rings, said male packing adaptor being formed of sintered porous metal to permit the adjacent packing rings immediately to seat thereon without distortion by dispersion of a fluid medium through said adaptor at any point when pressure is applied thereto.

References Cited in the file of this patent

UNITED STATES PATENTS

| | | |
|---|---|---|
| 1,771,890 | Hubbard | July 29, 1930 |
| 2,029,598 | Timbs et al. | Feb. 4, 1936 |
| 2,075,444 | Koehring | Mar. 30, 1937 |
| 2,359,386 | Reinsch | Oct. 3, 1944 |
| 2,473,139 | Dickerman | June 14, 1949 |